US012780249B1

(12) United States Patent
Wang et al.

(10) Patent No.: US 12,780,249 B1
(45) Date of Patent: Nov. 3, 2026

(54) WORLD-MODEL-BASED PLANNING WITH ADAPTIVE FINETUNING FOR AUTONOMOUS DRIVING

(71) Applicant: Robert Bosch GmbH, Stuttgart (DE)

(72) Inventors: Hang Wang, Davis, CA (US); Xin Ye, San Jose, CA (US); Feng Tao, Cupertino, CA (US); Chenbin Pan, Sunnyvale, CA (US); Abhirup Mallik, San Jose, CA (US); Burhaneddin Yaman, San Jose, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/184,475

(22) Filed: Apr. 21, 2025

(51) Int. Cl.
*B60W 60/00* (2020.01)
*B60W 50/00* (2006.01)
*G06N 3/044* (2023.01)
*G06N 3/092* (2023.01)

(52) U.S. Cl.
CPC ...... *B60W 60/001* (2020.02); *B60W 50/0097* (2013.01); *G06N 3/044* (2023.01); *G06N 3/092* (2023.01)

(58) Field of Classification Search
CPC ............... B60W 60/00; B60W 60/001; B60W 50/0097; G06N 3/044; G06N 3/092
USPC ............................................................ 701/23
See application file for complete search history.

(56) References Cited

U.S. PATENT DOCUMENTS 11,906,315 B2 * 2/2024 Wang ................. G01C 21/3469
12,229,972 B2 * 2/2025 Maurer ................ G06N 3/0464
2022/0335624 A1 * 10/2022 Maurer .................... G06N 3/08
2024/0256860 A1 8/2024 Shalev-Shwartz et al.
2026/0116419 A1 * 4/2026 Mallik ................ B60W 60/001

FOREIGN PATENT DOCUMENTS

CN 111159542 A 5/2020
CN 119150357 A 12/2024

OTHER PUBLICATIONS

Lee, Yoonho, et al. "Surgical fine-tuning improves adaptation to distribution shifts." arXiv preprint arXiv:2210.11466 (2022).
Kingma, Diederik P., and Max Welling. "Auto-encoding variational bayes." Dec. 20, 2013.
Wang, Hang, et al. "AdaWM: Adaptive World Model based Planning for Autonomous Driving." arXiv preprint arXiv:2501.13072 (2025).
Radford, Alec, et al. "Learning transferable visual models from natural language supervision." International conference on machine learning. PmLR, 2021.
Hafner, Danijar, et al. "Mastering diverse domains through world models." arXiv preprint arXiv:2301.04104 (2023).

* cited by examiner

*Primary Examiner* — Andrew Joseph Rudy
(74) *Attorney, Agent, or Firm* — Brooks Kushman P.C.

(57) ABSTRACT

A method of training an autonomous vehicle system including pretraining first and second components to form a pretrained model, employing the pretrained model in an operative environment to identify a predominant source of error, and updating either the first component or the second component based on which one is the predominant source of error. The first component being configured to predict future events from sensory inputs and a second component being configured to determine one or more actions based on the future events with a dataset.

19 Claims, 4 Drawing Sheets

MODEL-ONLY FINETUNING

POLICY-ONLY FINETUNING

AdaWM

C=2

C=10

C=50

WORLD-MODEL-BASED PLANNING WITH ADAPTIVE FINETUNING FOR AUTONOMOUS DRIVING

TECHNICAL FIELD

This disclosure relates to systems and methods for training world-model-based reinforcement learned models trained with adaptive finetuning employed in autonomous vehicles.

BACKGROUND

Autonomous driving has produced significant excitement and appears to have numerous potential benefits. Accordingly, substantial resources and development have targeted autonomous driving technologies. However, autonomous driving is not without momentous and complex challenges. In addition to overcoming the many challenges and great complexity of autonomous driving systems, these systems must be accurate and robust enough to obtain considerable public confidence. Artificial intelligence appears to be a powerful tool in tackling the challenges and complexity of autonomous driving but itself offers challenges and complexity. Solutions to overcome these challenges with sufficient accuracy and robustness are still needed.

SUMMARY

A method of training an autonomous vehicle system is provided. The method may include pretraining a first component and a second component with an (e.g., offline) dataset, employing the first and second component after pretraining (i.e., pretrained model) to an operative environment to identify a predominant source of error, updating the either the first component or the second component responsive identify the predominant source of error based on the predominant source of error. The first component may be a predictive component configured to predict future event from input such as sensory inputs. The second component may be a planning component to determine one or more actions based on the future events predicted by the predictive component. Once pretrained the first and second components may form a pretrained model. The operative (e.g., online) environment may provide sensory inputs such as inputs from a vehicle sensory system.

Identifying the predominant source of error may include comparing a first error associated with the first component and a second error associated with the second component. The first component may be a predictive component such as a world model employing a recurrent neural network and the second component may be a planning component such as a planning policy. The first error may be a construction error associated with the predictive component and the second error may be a distribution shift associated with the planning component such that if the construction error is predominant the predictive component is retrained with sensory inputs from the operative environment and if the distribution shift is predominant the policy is adjusted. The predictive world model component may stimulate and predict future states and the planning policy component may determine one or more actions based on the world simulations and predicted states of the predictive world model. Updating the predictive component may include a low-rank finetuning technique such as decomposing one or more model parameters into two lower dimension vectors. The sensory inputs may be received or configured to receive the sensory inputs from one or more sensors of a vehicle system. Once updated the predictive component and planning component may provide actions to a vehicle control system to control or actuate one or more one or more actuators of a vehicle.

A training system for training an autonomous vehicle system is also provided. The training system comprises one or more computing devices to pretrain an artificial intelligence (AI) model having a first component and a second component with a dataset to form a pretrained model, employ the pretrained model to one or more tasks such that one or more observations is received by the model, identify whether the first component or second component is predominantly contributing to performance degradation of the model based on the one o more observations and responsive to employing the pretrained model, and selectively finetune either the first component or the second component based on whether the first component or the second component is predominantly contributing to performance degradation of the model.

Selective finetuning may include retraining the first component of the pretrained model on the one or more observations if the first component is predominantly contributing to performance degradation and adjusting the second component of the pretrained model if the second component is predominantly contributing to performance degradation. The first component may be a predictive component, and the second component may be a planning policy component. Predominance may be determined by comparing a total variation distance of the predictive component with the total variation distance of the planning component. The total variation distance of the predictive component may be indicative of the gap between the predicted states of the first component and the actual states. The total variation distance of the second component may be indicative of the gap between an optimal planning policy and the current planning policy. A threshold value may be applied to the total variation distance of the planning policy component before comparing with the total variation of the predictive component. The threshold may be greater than 1, at least 2, at least 10, or at least 50. The predictive component may be a world model configure to simulate real-world environments to predict outcomes. The one or more observations may be observations received from a sensory input system of a vehicle.

A non-transitory computer-readable medium storing instructions for training an artificial intelligence (AI) system is provided. The AI system may be used for autonomous driving. The instructions may be executable by one or more processors to optimize an autonomous driving model. The instructions may retrain a world model of a pretrained model on data from an operative environment responsive to identifying error associated with the world model and adjust a planning policy of the pretrained model based on data from the operative environment responsive to detecting a distribution shift associated with the planning policy.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
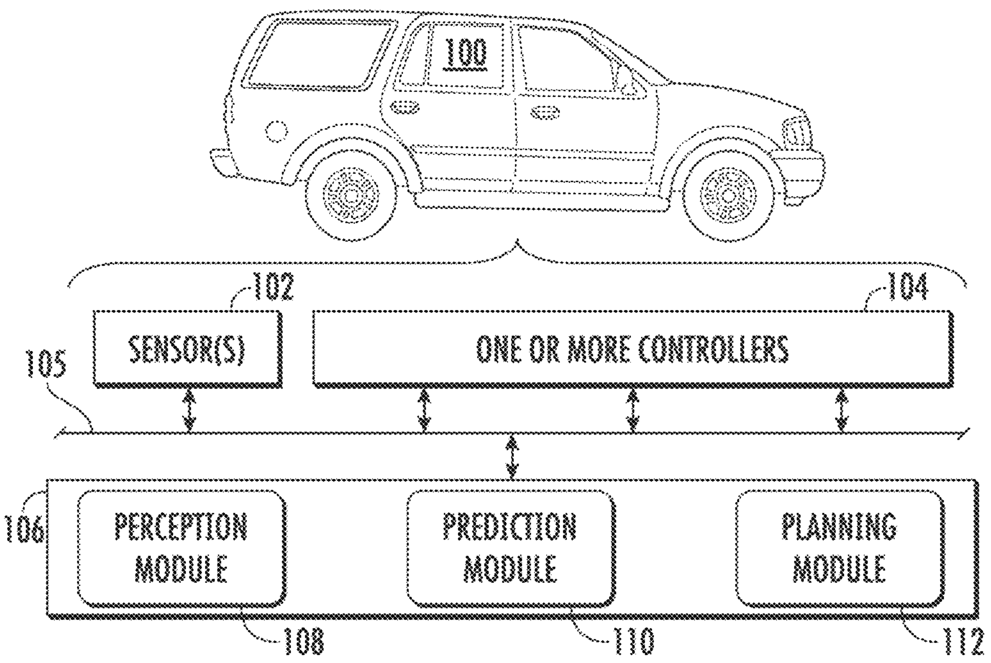
FIG. 1 illustrates an autonomous vehicle.

Referring to FIG. 1, a vehicle 100 having an autonomous driving system is shown. In various embodiments a vehicle may be a terrestrial, maritime, aeronautical, or extraterrestrial vehicles such as an automobile, train, boat, ship, plane, spacecraft, and/or unmanned vehicles such as drones or rockets. In one or more embodiments, the autonomous driving system may include an end-to-end autonomous driving stack 106. The end-to-end autonomous driving stack 106 may be modular. For example, the autonomous driving system may include a perception portion 108, a prediction portion 110, and/or a planning portion 112 that cooperate to provide autonomous driving. In a refinement, the autonomous driving system may include or lack explanation and reasoning capabilities. In various embodiments, autonomous driving stack 106 cooperates with various sensors 102 and one or more controllers 104 via a communication network 105 to achieve autonomous driving. The sensors may be used to detect and understand the environment around the vehicle. For example, the perception portion 108 of the autonomous driving stack 106 may receive inputs from one or more sensors 102 and the planning portion 112 may convey decisions/tasks/actions to the one or more controllers 104 to control or actuate an actuator. For example, the decisions/tasks/actions may include actuating a throttle valve or gas pedal to accelerate, rotating a steering column to turn, and/or actuating the brakes such as to enter the freeway, make a lane change, or avoid a pedestrian.

Figure 2:
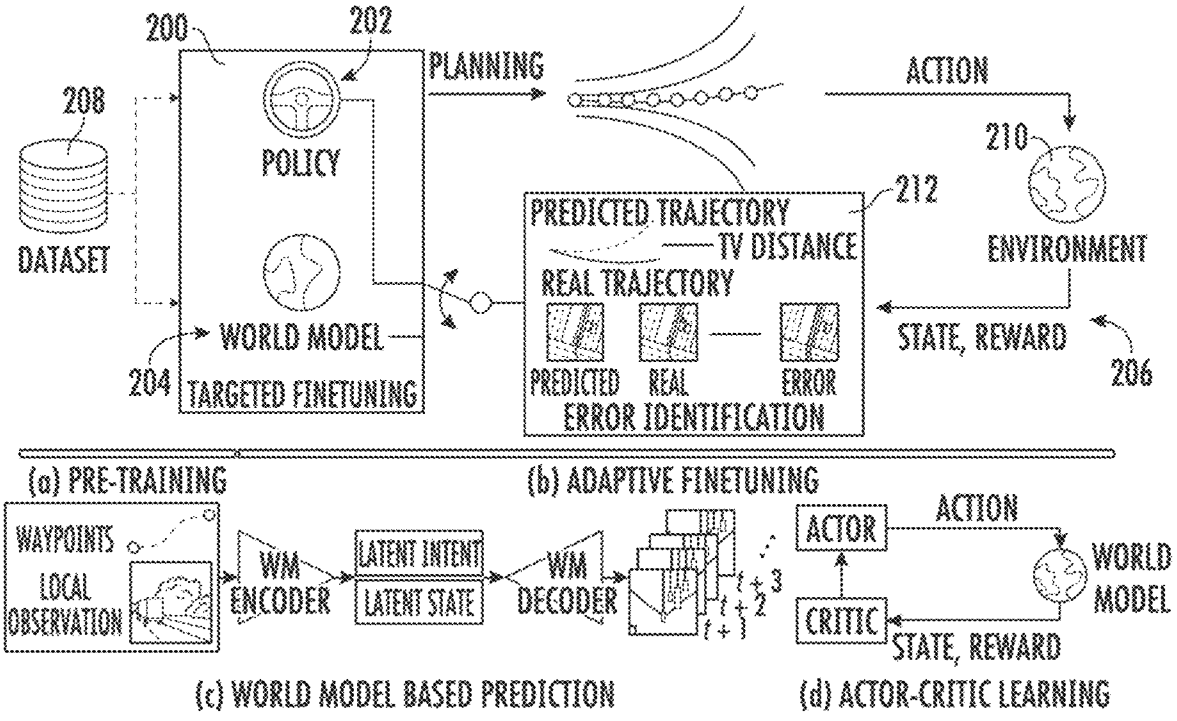
FIG. 2 illustrates an example block diagram of a training system.

Autonomous driving systems must accurately predict future situations as well as take actions based on those predictions. Accordingly, the autonomous driving system may employ artificial intelligence (AI) such as machine learning. As shown in FIG. 2, the AI model 200 may include a predictive component 204 to predict future events and a planning component 202 to guide decision-making and/or control. For example, the autonomous vehicle system may include unsupervised learning such as reinforcement learning model 206. For example, reinforcement learning models may incorporate a Markov Decision Process (MDP) defined as shown in formula 1:

$$\langle S,A,P,r,\gamma\rangle \tag{1},$$

where S represents the state space, A represents the action space, P represents transition probability, r represents a reward, and γ represents a discounting factor.

Reinforcement learning models employ an agent to learn through trial and error rather than through labeled data sets. For example, reinforcement learning may employ an actor-critic feedback strategy as shown in FIG. 2. During training, the agent adapts the model 200 such as by modifying the planning policy ($\tau_\omega$) 202 through rewards (and penalties) associated with success and failure of performing a task. In various embodiments, the reinforcement learning model may employ a predictive latent model to forecast potential events and a planning policy ($\tau_\omega$) to guide actions (a). For example, the policy may be represented by formula 2:

$$\tau_\omega(a|s) \tag{2},$$

where a is representative of an action and s is representative of an observation. In various embodiments, the autonomous vehicle system may include a world model-based reinforcement learning model. In at least some embodiments, the world model ($WM_\Phi$) and/or predictive component 204 may be a recurrent model such as a recurrent neural network (RNN). World models seek to understand environments and relationships between object as well as simulating future outcomes. Further, World Models may employ generalizations to navigate new tasks or situations. For example, World Models may use latent variables to handle uncertainty and represent unknown information that affects predictions. In other words, World Models model how actions affect future states. In various embodiments, the world model includes an encoder component and a predictive component. The encoder may transform observations into latent representations. The model may be an autoregressive model such that historical states are considered in determining predicted states. In one or more components, the model is an Action-Conditional Prediction model. The world model ($WM_\Phi$) represents latent dynamics of the operating environment and predicts rewards (r) and future latent states (z). Incorporating a world model ($WM_\Phi$) in reinforcement learning model may allow the system to internally simulate possible future scenarios.

In one or more embodiments, the model may be trained using a pretraining-finetuning paradigm. This may be preferable, for example, to learning a world model ($WM_\Phi$) 204 and policy ($\tau_\omega$) 202 from scratch especially for complex task such as autonomous driving, which may require a large state space(S). In various embodiments, the world model ($WM_\Phi$) and policy ($\tau_\omega$) components 204, 202 may be pretrained with offline data 208 (e.g., a dataset) for initialization. The pretrained dynamics model may be represented as $WM_\Phi(P)$ and the dynamics model of a new task may be represented as $WM_\Phi(\hat{P})$, where P and $\hat{P}$ represent the corresponding probability transition matrices. Once trained the dynamics model may guide policy learning. For example, the planning policy $\tau_\omega$ may be learned by maximizing a value function such as that represented below in formula 3:

$$V_{WM-\phi}^{\pi_\omega}(x_t) \triangleq E_{x_{t\sim WM_\phi}, a\sim\phi_\omega}\left[\sum_{i=1}^{K} \gamma^i r\left(x_{t+i-1, a_{t+i-1}}\right) + \gamma^K Q^{\pi_\omega}(x_t + k, a_t + K)\right], \tag{3}$$

where the first term is the cumulative reward from a K-step and the second term is an expected cumulative reward of an action represented by a Q-function such as formula 4:

$$Q^{\pi_\omega}(x_t, a_t) = E_{a\sim\pi_\omega}[\Sigma_t \gamma^t r(x_t, a_t)] \tag{4}$$

where $a_t$ is the action and $x_t$ is a state. Thus, predictions from the dynamics model inform the policy learning.

However, the generalizations from pretraining may not align well with specific task and realities leading to error and distribution shifts. In one or more embodiments, a construction error may be determined by comparing predictions from the predictive portion 204 against actual outcomes observed in the operative or current environment to detect significant deviations between the model's predictions and reality. These weaknesses may be improved through retraining of the model. Distribution shifts may be determined by detecting differences between the data distribution from pretraining and the operative environment or current task. For example, a performance gap may be defined according to formula 5:

$$\eta - \hat{\eta} = E_{x\sim\rho_o}\left[V_{WM_\phi(P)}^{\pi}(x) - V_{WM_\phi(\hat{P})}^{\pi}(x)\right], \tag{5}$$

where $\rho_0$ is the initial state distribution. The second term is the expected return of applying the pretrained model and the policy to the new task with dynamics $\hat{P}$.

Thus, after pretraining for generalized features and tasks, finetuning 212 may be employed for more specific tasks. This pretrained model may then be further initialized online with an operating environment 210 such as one or more real-world environments or situations. The world model ($WM_\phi$) may learn a latent state based on observations from sensory inputs ($o_t$) through autoencoding. For example, observation $s_t$ may be encoded into a latent state represented by formula 6:

$$z_t \in Z \subseteq R^d \tag{6}$$

where $z_t$ represents a latent state, Z represents the latent space, and $R^d$ represents a d-dimension real number/vector. The encoder ($q_\phi$) may be represented by formula 7:

$$z_t \sim q_\phi(z_t | h_t, o_t) \tag{7}$$

where $q_\phi$ represents an encoder, $h_t$ represents a hidden state, and $o_t$ represents observational inputs. The model state $x_t$ may be represented by formula 8:

$$x_t := [h_t \phi z_t] \in X \tag{8}$$

where $\phi$ represents a parameter. The model then uses this current model state to predict the next recurrent state ($h_{t+1}$) based on action ($a_t$). The corresponding sequence model may be represented as formula 9:

$$h_{t+1} = f_\phi(x_t, a_t) \tag{9}$$

The next step may be represented by formula 10:

$$\hat{z}_{t+1} \sim p_\phi(\cdot | h_{t+1}) \tag{10}$$

where $h_{t+1}$ includes information about the latent representation of this step. The model also uses the model state ($x_t$) to predict a reward represented by formula 11:

$$\hat{r}_{t+1} \sim p_\phi(\cdot | x_{t+1}) \tag{11}$$

and episode continuation flags represented by formula 12:

$$\hat{c}_{t+1} \sim p_\phi(\cdot | x_{t+1}) \tag{12}$$

An agent employs the pretrained world model and policy to simulate tasks and executes a plan with the highest predicted return. For example, the world model ($WM_\phi$) may be used to generate imaginary trajectories over horizon K>0, as represented in formula 13:

$$\{x_{t+k}, a_{t+k}\}_{k=1}^{K}, \tag{13}$$

where $x_t$ is the current state and $a_t$ is the current actions simulated from the policy ($\pi$). However, naively initializing online may result in significant and detrimental performance degradation.

Figure 3:
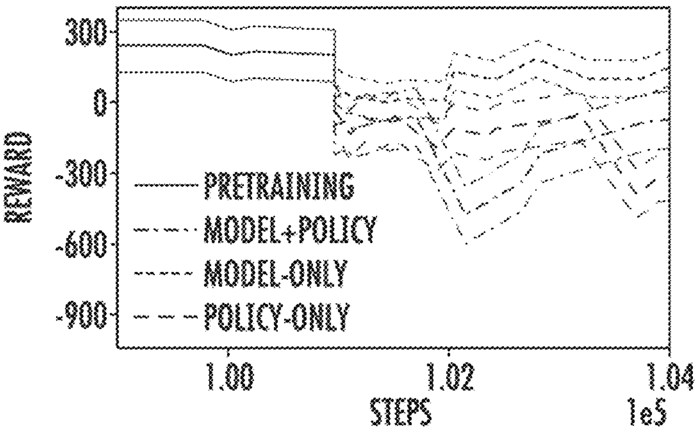
FIG. 3 illustrates performance degradation of various finetuning strategies.

In various embodiments, the finetuning may be selectively tailored to a specific component (e.g., 202, 204) of the model (i.e., adaptive/selective finetuning) to more efficiently mitigate performance degradation. Some systems may employ finetuning techniques indiscriminately (e.g., model-only finetuning, policy-only finetuning, alternating between model and policy finetuning) to one or more components. For example, FIG. 3 illustrates various indiscriminate finetuning strategies and a selective finetuning strategy as described herein. For example, these tasks were carried out in a CARLA environment where the agent was provided a bird-eye-view observation at each time step (t) as the agent navigates through the tasks executing on action ($a_t$) and receives reward ($t_t$). In some embodiments, the reward may be based on attributes such as safety, comfort, driving time, velocity, and distance associated with navigating the waypoints. For example, a weight sum of these attributes may be used. Pretraining may be carried out for 12 hours on tasks from the CARLA leaderboard v2. The pretrained model and policy may then be finetuned for an hour. For example, conventional systems may indiscriminately apply finetuning solely to the predictive component, solely to the planning component, or to both the predictive and planning components such as in an alternating manner.

However, selectively or discriminately applying finetuning 212 to the component that needs it the most (i.e., adaptive finetuning) may be more effective to mitigating performance degradation as shown in FIGS. 4A-D.

Figure 4A:
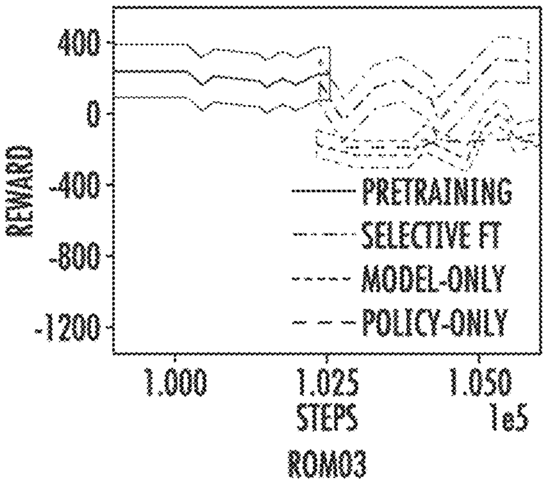
FIGS. 4A-D illustrate performance degradation of various finetuning strategies according to certain tasks.
Figure 4B:
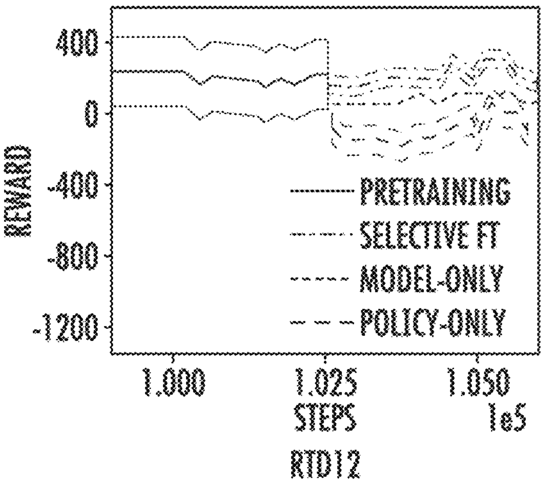
Figure 4C:
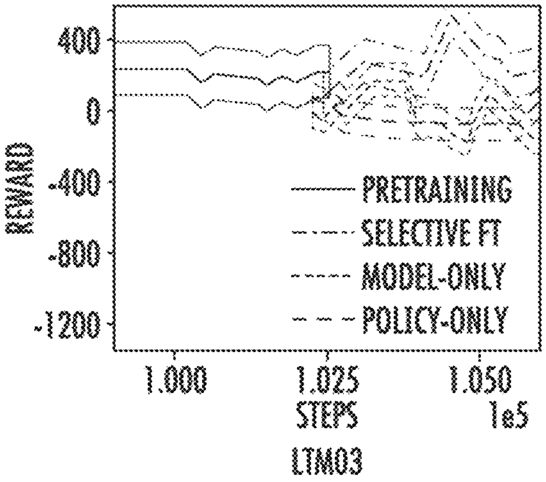
Figure 4D:
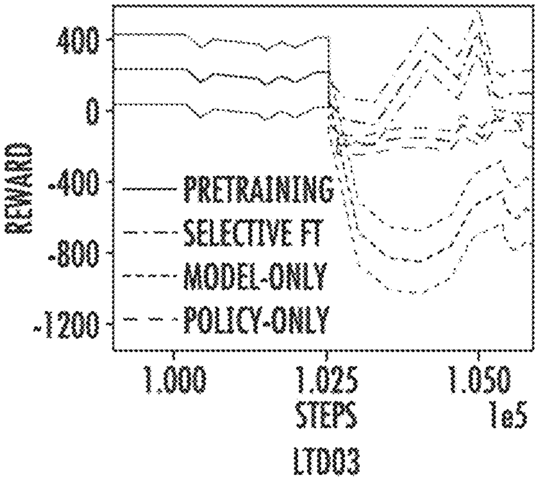
Figure 5A:
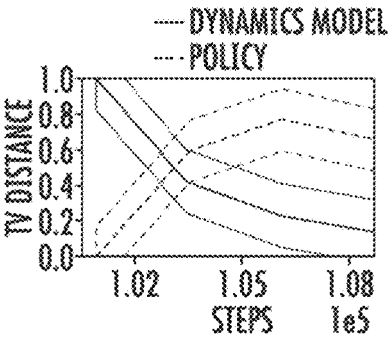
FIGS. 5A-C illustrate total variation of components of a model employing different finetuning strategies.
Figure 5B:
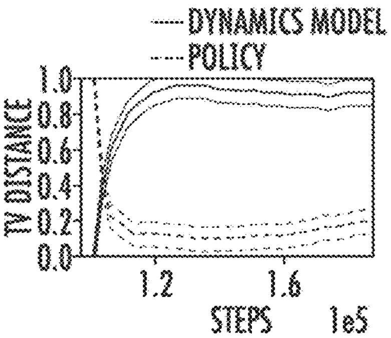
Figure 5C:
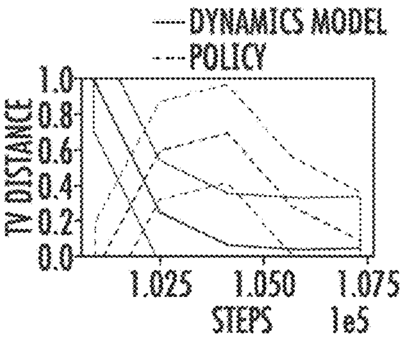

FIG. 4A shows performance degradation of different finetuning techniques (e.g., model-only finetuning, policy-only finetuning, and adaptive finetuning) for a roundabout task in moderate traffic. FIG. 4B shows performance degradation of different finetuning techniques for a right turn task in dense traffic. FIG. 4C shows performance degradation of different finetuning techniques for a left turn task in moderate traffic. FIG. 4D shows performance degradation of different finetuning techniques for a left turn task in dense traffic. For example, applying finetuning 212 to either the predictive component (e.g., world model) or the planning component (e.g., policy) based on which component is predominately contributing to degradation or impairing performance may be more effective that indiscriminate finetuning.

In one or more embodiments, the finetuning step 212 may include identifying error for a task associated with the components (e.g., a plurality of components such as the predictive component and the planning component) and targeting modification to the component most significantly contributing to the performance degradation. Adaptive finetuning identifies and resolves the greatest divergence in the model by targeting a specific component of the model. In a refinement, the error associated with the predictive component 204 and the error associated with the planning component 202 may be compared to determine which is predominant. In various embodiments, the predictive component 204 may be modified, responsive to the error of the predictive component 204 being predominant (e.g., greater than the error of the planning component 202), or the planning component 202 may be modified, responsive to the error of the planning component 202 being predominant (e.g., greater than the error of the predictive component 204). For example, targeted finetuning 212 to the predictive component 204 may be carried out such as by retraining the predictive component 204 with the new online data from the current task and/or operative environment.

In a variation, a construction error of the predictive component 204 and a distribution shift of the planning component 202 may be considered. In other words, the construction error of the predictive component (e.g., world model) may be compared with the distribution shift of the planning component to determine which is predominant. For example, the state prediction error at each step (e.g., k=1, 2, . . . , K) may be assessed using the world model ($WM_\phi$). The state prediction error may be defined according to formula 14:

$$\epsilon_k = x_k - \hat{x}_k \quad (14),$$

where $x_k$ is real or true state of the new task and $\hat{x}_k$ is the predicted state. The state prediction error may be decomposed. In various embodiments, the prediction error is decomposed such that each term corresponds to different factors such as distribution shifts between task and limitations of generalization that contribute to inaccuracies of the model. In a refinement, the terms may thus correspond to different components of the overall model. For example, the state prediction error may be decomposed into at two terms each respectively associated with either the policy component or the predictive component. In one or more embodiments, decomposition may be represented by formula (15):

$$\epsilon_k = (x_k - \bar{x}_k) + (\bar{x}_k - \hat{x}_k) \quad (15),$$

where $\bar{x}_k$ corresponds to the true state when planning is executed in pretraining tasks. The first term may correspond to distribution shift between task thus representing differences between the trues states in the current task and the pretraining task. The second term may correspond to the prediction error of the pretrained model on the pretraining task.

In various embodiments, predominance may be determined by calculating a total variation (TV) distance associated with the components. For example, a TV distance may be determined between the true state probability (P) and the predicted dynamics ($\hat{P}$). The TV distance may be upper bounded by $\varepsilon_{\hat{P}}$, which may be represented by formula 16:

$$E_\pi[D_{TV}(P \| \hat{P})] \leq \varepsilon_{\hat{P}} \quad (16).$$

The upper bound for the prediction error may be represented by formula 17:

$$\epsilon_k \leq \varepsilon_{\sigma,k} \quad (17).$$

In some embodiments, the upper bound of the performance drop may be characterized by formula 18:

$$\Gamma := \frac{1-\gamma^{K-1}}{1-\gamma} L_r(1+L_\pi) + \gamma^K L_Q(1+L_\pi), \quad (18)$$

where $L_Q$ is represented by formula 19:

$$L_Q = L_r/(1-\gamma) \quad (19).$$

The policy shift between the pretrained policy (x) and the optimal policy (f) may be represented by formula 20:

$$\varepsilon_\pi := \max_x D_{TV}(\pi | \hat{\pi}) \quad (20).$$

Thus, the upper bound of the performance gap may be represented according to formula 21:

$$\eta - \hat{\eta} \leq \left(\gamma^K \frac{\varepsilon_{max}}{1-\gamma^K} + \Gamma \frac{2\gamma \mathcal{E}_{\hat{P}}}{1-\gamma^K}\right) + \Gamma\left(\frac{4 r_{max} \mathcal{E}_\pi}{1-\gamma} + \frac{4\gamma \mathcal{E}_\pi}{1-\gamma^K}\right), \quad (21)$$

where $\varepsilon_{max}$ is represented by formula 22:

$$\varepsilon_{max} = \max_t \varepsilon_{\delta,t} \quad (22).$$

The upper bound of the performance gap (e.g., formula 21) demonstrates the two primary causes impacting performance and contributing to degradation. For example, $\varepsilon_{max}$ and $\varepsilon_{\hat{P}}$ may represent the mismatch of the dynamics model and Er may represent the mismatch of the policy. Thus, the mismatch of the predictive model and the mismatch of the rules/policy may be compared to identify the predominate contributor to performance degradation. Finetuning can then be more accurately focused on the predominant component affecting performance degradation, i.e., either the predictive component or the policy/rules component.

In various embodiments, the error or mismatch associated with each component may need to be normalized to one another such that predominance and its contribution to performance degradation are accurately determined. In a refinement, this may be achieved with a threshold (e.g., 2, 10, or 50) which normalizes the error associated with the dynamics model and the error associated with the policy. Thus, predominance and selective finetuning may be determined by the relationship of formula 23:

$$D_{TV}(P | \hat{P}) > C \cdot D_{TV}(\pi | \hat{\pi}) \quad (23),$$

where C represents the threshold such that if true the dynamics model is finetuned or update such as by retraining on data from the current task. However, if false the policy may be finetuned or update. In a refinement, the threshold (C) may be a function of certain criterion. In various embodiments, this parameter may be determined by trial and error (i.e., a grid search), comparison/analysis of other finetuning strategies such as model-only, policy-only, or alternating iterative finetuning. For example, the threshold (C) may be a function of $C_1$ and $C_2$ which may be associated with certain criterion to accurately determine the dominating mismatch. The function $C_1$ may be represented by formula 24:

$$C_1 = (2 r_{max}(1-\gamma^k)/(\gamma-\gamma^2)+2) \quad (24), \text{ and}$$

the function $C_2$ may be represented formula 25:

$$C_2 = \frac{\gamma^{K-1} \mathcal{E}_{max}}{2\Gamma}. \quad (25)$$

In various embodiments, the criterion may be summarized by formula 26 and 27 shown below:

$$\mathcal{E}_{\hat{p}} \geq C_1 \mathcal{E}_{\pi} - C_2, \text{ and} \tag{26}$$

$$\mathcal{E}_{\pi} \geq \frac{1}{C_1}\mathcal{E}_{\hat{p}} + \frac{C_2}{C_1}. \tag{27}$$

Thus, if the criterion represented by formula 26 is true the errors associated with the predictive model may be the dominating cause of performance degradation such that finetuning of the predictive model may be more impactful to an improved system, and if the criterion represented by formula 27 is true the suboptimal decisions of the policy may be the dominating cause of the performance degradation such that finetuning of the policy may be more impactful to an improved system. In various embodiment, the more simplified criteria may be used to reduce computational complexity.

Figure 6A:
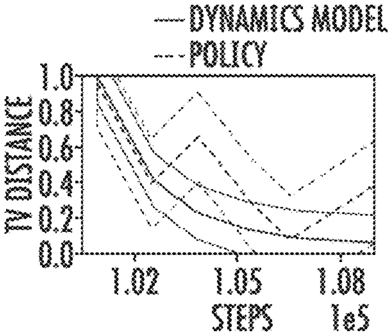
FIGS. 6A-C illustrate total variation of components of a model employing an adaptive finetuning strategy with different threshold values.
Figure 6B:
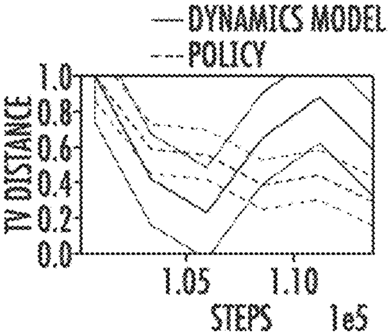
Figure 6C:
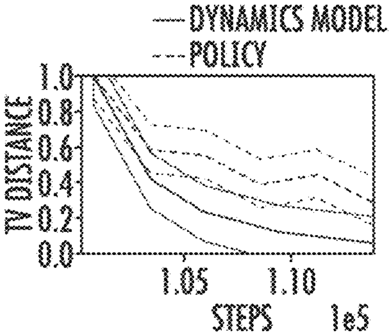

For instance, FIG. 6A demonstrates TV distance of a dynamics component and a policy component of a model employing adaptive finetuning with a threshold of 2; FIG. 6B demonstrates TV distance of a dynamics component and a policy component of a model employing adaptive finetuning with a threshold of 10; and FIG. 6C demonstrates TV distance of a dynamics component and a policy component of a model employing adaptive finetuning with a threshold of 50. In a refinement, the threshold is greater than 1, 1.5, 2, 5, 9, 10, 25, 45, or 50 and/or less than 100, 75, 55, 30, 15, or 5. In other words, the threshold may be at least 2, at least 5, at least 10, at least 25, or at least 50 and/or no more than 5, 15, 30, 55, 75, or 100.

In various embodiments, the finetuning stage may include various finetuning techniques such as a low rank (LoRa) finetuning strategy. Alternatively, or in combination, full or end-to-end finetuning, parameter-efficient finetuning (PEFT), adapter layers (e.g., AdapterFusion and Houlsby Adapters), prefix or soft prompt finetuning, Bias-term finetuning (BitFit), Quantizied LoRa (QLoRa), and/or reinforcement learning from human feedback (RLHF) may be used. In one or more embodiments, LoRa finetuning may employ more moderate changes and thus be more effective because it avoids drastic changes or changes that are too great. In a refinement, finetuning of the predictive component, may, for example, involve decomposing the model parameter into (two) lower dimension vectors such as latent representation base vector Z and vector $\phi$. In at least some embodiments, only the weights B of the base vector may be updated. For example, this finetuning may be represented by formula 28:

$$\phi' \leftarrow (BZ)^T \phi \tag{28}$$

In various embodiments, this stage may include aligning with the new data distribution. In a refinement, finetuning of the planning component, may, for example, involve decomposing the policy network ($\omega$) into a weighted combination of sub-units $\Omega$ as represented in formula 29:

$$\omega' \leftarrow \Delta^T \Omega \tag{29}$$

In some embodiments, during finetuning only the weights $\Delta$ are updated.

In one or more embodiments, centralized or decentralized finetuning techniques may be used. For example, finetuning may occur on one or more local devices of one or more users or on a centralized location such as one or more servers (e.g., one or more webserver). In a variation, an aggregated dataset may be used for training and/or finetuning. In a refinement, commercial or other available autonomous driving datasets may be used such as the Waymo, nuScenes, Argoverse, Lyft Level 5, KITTI, ApolloScape, BDD100K, and/or PandaSet dataset. In various embodiments, finetuning may not include injecting noise into finetuning or training updates/gradients. In one or more embodiments, all, some, or at least one of the parameters of either the predictive component or planning component may be updated during finetuning.

Figure 7:
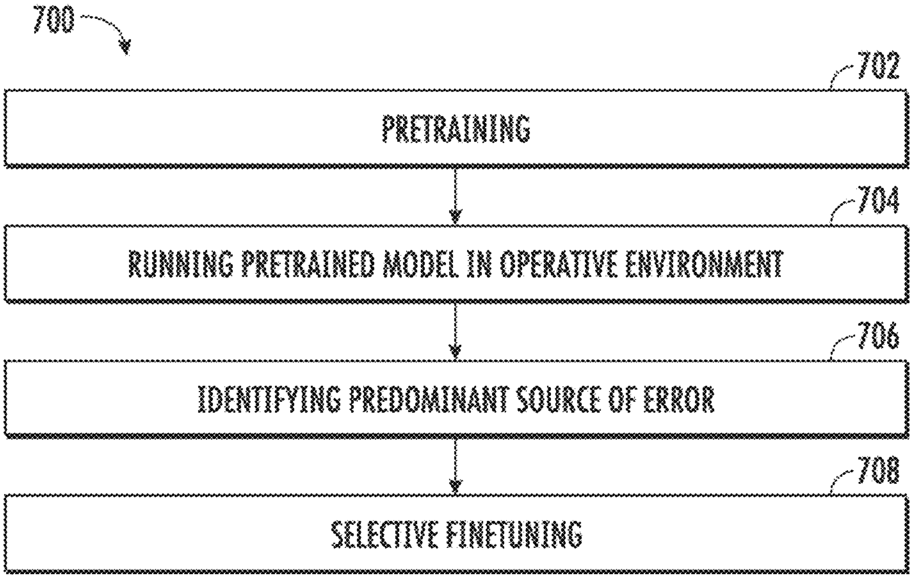
FIG. 7 is a method of training an artificial intelligence model.

Referring to FIG. 7, a method 700 of training an artificial intelligence model is provided. In various embodiments, the training strategy includes a pretraining-finetuning paradigm. The method 700 includes pretraining a predictive model to derive a policy on a dataset for autonomous driving (i.e., step 702), employing the trained model and policy in an operative environment (i.e., step 704), identifying the predominant source of error (i.e., step 706), finetuning either the predictive model or the policy based on the predominant source of error (i.e., step 708). In one or more embodiments, the predictive model may be a world model implementing a recurrent neural network. Pretraining may be conducted with an available autonomous driving dataset for at least 8 hours, at least 10 hours, or at least 12 hours. In various embodiments, error may be identified as described herein. In a refinement, finetuning may include retraining the model with observations from the operative environment. In various embodiments, finetuning may be repeated for at least 30 minutes, at least 45 minutes, or at least 1 hour.

Figure 8:
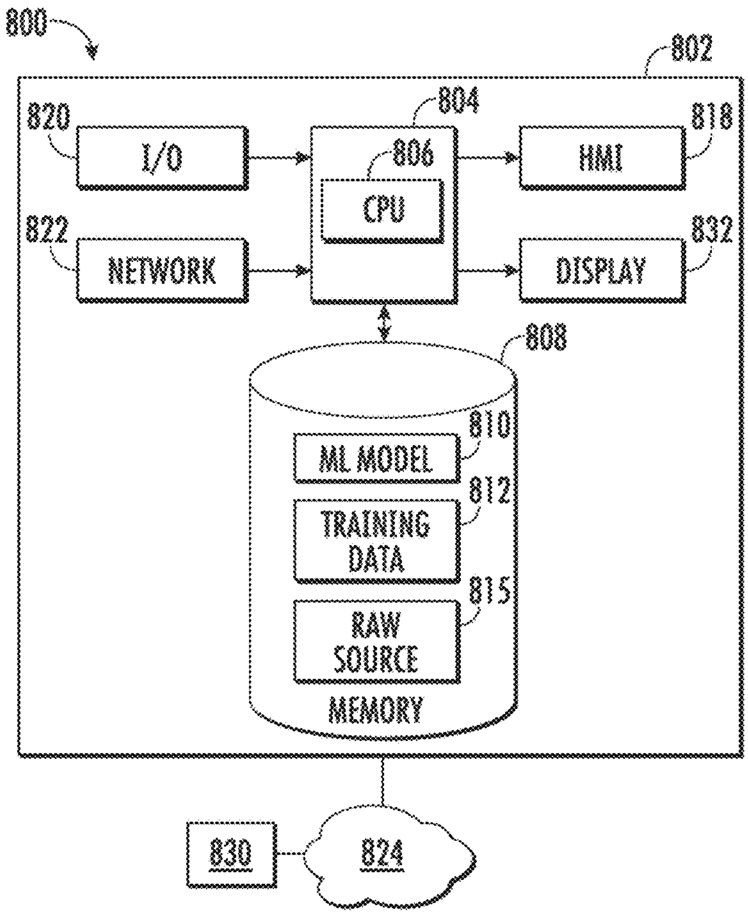
FIG. 8 illustrates an embodiment of a system that may be used for training and/or operating one or more models and/or components described herein.

FIG. 8 shows system 800 that may be used for training and/or operating one or more models and/or components described herein. The system 800 may include at least one computing system and/or device 802. The computing system 802 may include at least one processor 804 that is operatively connected to a memory unit 808. The processor 804 may be one or more integrated circuits that implement the functionality of a central processing unit (CPU) 806. Alternatively, the processor 804 may be designed to implement the functionality of a graphic processing unit (GPU). The CPU 806 may be a commercially available processing unit that implements an instruction set such as one of the x86, ARM, Power, or MIPS instruction set families.

During operation, the CPU 806 may execute stored computer readable/machine/program instructions that are retrieved from the memory unit 808. The stored computer readable/machine/program instructions may include software that controls operation of the CPU 806 to perform the operation described herein. In some embodiments, the processor 804 may be a system on a chip (SoC) that integrates functionality of the CPU 806, the memory unit 808, a network interface, and input/output interfaces into a single integrated device. The computing system 802 may implement an operating system for managing various aspects of the operation.

The memory unit 808 may include volatile memory and non-volatile memory for storing instructions and data. The non-volatile memory may include solid-state memories, such as NAND flash memory, magnetic and optical storage media, or any other suitable data storage device that retains data when the computing system 802 is deactivated or loses electrical power. The volatile memory may include static and dynamic random-access memory (RAM) that stores computer readable/machine/program instructions and data. For example, the memory unit 808 may store a machine-learning model 810 or algorithm, training dataset 812 for the machine-learning model 810, and/or raw source data 815.

The computing system 802 may include a network interface device 822 that is configured to provide communication with external systems and devices. For example, the network interface device 822 may include a wired and/or wireless Ethernet interface as defined by Institute of Electrical and Electronics Engineers (IEEE) 802.11 family of standards. The network interface device 822 may include a cellular communication interface for communicating with a cellular network (e.g., 3G, 4G, 5G). The network interface device 822 may be further configured to provide a communication interface to an external network 824 or cloud.

The external network 824 may be the world-wide web or the Internet. The external network 824 may establish a standard communication protocol between computing devices. The external network 824 may allow information and data to be easily exchanged between computing devices and networks. One or more servers 830 may be in communication with the external network 824.

The computing system 802 may include an input/output (I/O) interface 820 that may be configured to provide digital and/or analog inputs and outputs. The I/O interface 820 may include additional serial interfaces for communicating with external devices. For instance, the I/O interface 820 may be configured to receive data from sensors that provide sensed signals.

The computing system 802 may include a human-machine interface (HMI) device 818 that may include any device that enables the system 800 to receive control input. Examples of input devices may include human interface inputs such as a keyboard, a computer mouse, a touchscreen, a microphone or other voice input device, a vehicle infotainment screen (which may include a plurality of buttons, knobs, and/or a touch screen, microphones) and other similar devices. The computing system 802 may include a display device 832. The computing system 802 may include hardware and software for outputting graphics and text information to the display device 832. The display device 832 may include an electronic display screen, projector, printer or other suitable device for displaying information to a user or operator. The computing system 802 may be further configured to allow interaction with remote HMI and remote display devices via the network interface device 822.

The system 800 may be implemented using one or multiple computing systems. While the example depicts a single computing system 802 that implements all of the described features, it is intended that various features and functions may be separated and implemented by multiple computing units in communication with one another. The particular system architecture selected may depend on a variety of factors.

The system 800 may implement a machine-learning algorithm 810 that is configured to analyze a dataset 815. The dataset 815 may include an input dataset for a machine-learning system. In one or more embodiments, dataset may include raw or sensory data that may be representative of input dataset. In some examples, the machine-learning algorithm 810 may be a recurrent neural network algorithm that may be designed to perform a predetermined function. For instance, the neural network may be employed in conjunction with the embodiments described herein.

The system 800 may store a training dataset 812 for the machine-learning algorithm 810 (e.g., CARLA, an urban driving dataset for autonomous driving). The training dataset 812 may represent a set of previously constructed data for training the machine-learning algorithm 810. The training dataset 812 may be used by a machine-learning algorithm 810 to learn weighting factors associated with a machine learning algorithm and/or a planning policy. The training dataset 812 may include a set of source data that corresponds to outcomes or results that the machine-learning algorithm 810 tries to duplicate via the learning process.

In one or more embodiments, the methods, systems, and models described herein may be embodied in algorithms such as on non-transitory computer-readable mediums that may be provided in one or more computing platforms or devices such as shown in FIG. 8.

Figure 9:
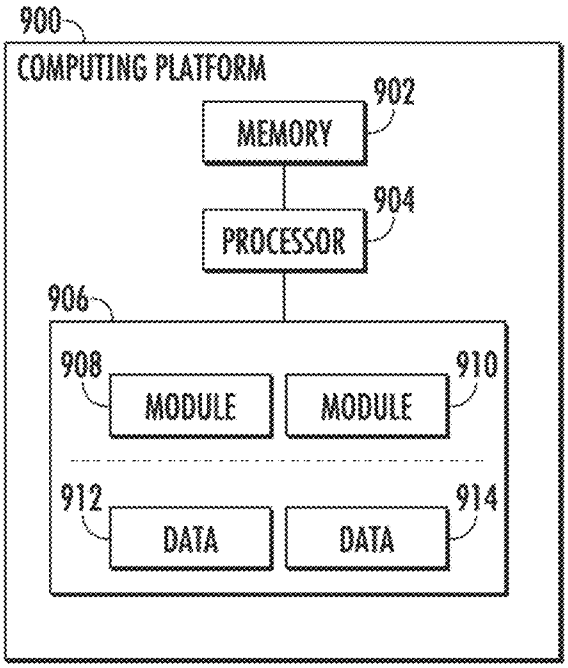
FIG. 9 illustrates an embodiment of a computing platform that may be used to implement the models and/or methods described herein.

A computing platform, such as the computing platform 900 as illustrated in FIG. 9 may be used to implement the models and/or methods described herein. The models and/or methods described herein may be implemented as part of a computational software suite. The computing platform 900 may include memory 902, processor 904, and non-volatile storage 906. The processor 904 may include one or more devices selected from high-performance computing (HPC) facilities including high-performance cores, microprocessors, micro-controllers, digital signal processors, microcomputers, central processing units, graphical processing units, tensor processing units, field programmable gate arrays, programmable logic devices, state machines, logic circuits, analog circuits, digital circuits, or any other devices that manipulate signals (analog or digital) based on computer-executable instructions residing in memory 902. A HPC facility may include advanced computing hardware and software configured to perform computationally intensive tasks at much higher speeds than a typical desktop or server computer. The HPC facility may deliver up to one (1) million random read input/output operations per second (IOPS).

Memory 902 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 906 may include one or more persistent data storage devices such as a hard drive, optical drive, tape drive, non-volatile solid state device, cloud storage or any other device capable of persistently storing information.

Processor 904 may be configured to read into memory 902 and execute computer-executable instructions residing in software modules 908 and 910 of the non-volatile storage 906 and embodying models and/or methods of one or more embodiments. Software modules 908 and 910 may include operating systems and applications. Software modules 908 and 910 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 904, the computer-executable instructions of software modules 908 and 910 may cause the computing platform 900 to implement one or more of the models and/or methods of one or more embodiments disclosed herein. The non-volatile storage 906 may also include data 912 and 914 supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

In one or more embodiments as described herein the models described here may cooperate with a control systems such as a vehicle control system such as to operate a vehicle. The vehicle control system may receive and provide information from with models. For example, the vehicle control system may include one or more sensors and provide sensory data or other data to the machine learning system. The vehicle control system may also receive output from the models such as decisions/tasks/actions guided by the planning policy. This output or inferences generated therefrom may serve as actuation signal(s) or initiate transmission of actuation signal(s) for controlling or actuating a device (e.g., robot, robotic arm, or device of the vehicle such as the throttle valve, steering, brakes, signal lights, etc.). As shown in FIG. 1, the vehicle or vehicle control system may include various sensors to obtain data/measurements. The control system may be configured to determine or ascertain an actuation signal from the models or systems described herein. The actuation signal may be used to control a vehicle device. The actuation signal may be supplied or transmitted to vehicle device. The vehicle device may be activated and controlled using the actuation signal. For example, the vehicle device may include one or more actuators to accommodate or inhibit movement and the actuation signal may control the one or more actuators.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within +0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Similarly, whenever listing integers are provided herein, it should also be appreciated that the listing of integers explicitly includes ranges of any two integers within the listing.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B". It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps. The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole. The phrase "consisting essentially of" limits the scope of a claim to the specified materials or steps, plus those that do not materially affect the basic and novel characteristic(s) of the claimed subject matter. The term "one or more" means "at least one" and the term "at least one" means "one or more." The terms "one or more" and "at least one" include "plurality" as a subset.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of training an autonomous vehicle system, the method comprising:

pretraining, with a dataset, a first component configured to predict future events from sensory inputs and a second component to determine one or more actions based on the future events, the first component and the second component, after pretraining, forming a pretrained model;

employing the pretrained model in an operative environment providing sensory inputs to identify a predominant source of error; and responsive to identifying the predominant source of error, updating either the first component or the second component based on the predominant source of error.

2. The method of claim 1, wherein identifying the predominant source of error includes comparing a first error associated with the first component and a second error associated with the second component.

3. The method of claim 2, wherein the first component is a predictive component, and the second component is a planning component.

4. The method of claim 3, wherein the first error is a construction error associated with the predictive component and the second error is a distribution shift associated with the planning component such that if the construction error is predominant the predictive component is retrained with sensory inputs from the operative environment and if the distribution shift is predominant the planning component is adjusted.

5. The method of claim 4, wherein the predictive component is a world model and the planning component is a planning policy to determine one or more actions based on predictions of the world model.

6. The method of claim 5, wherein the world model includes a recurrent neural network.

7. The method of claim 1, wherein updating the first component includes a low-rank finetuning technique.

8. The method of claim 7, wherein the low-rank finetuning technique includes decomposing a model parameter into two lower dimension vectors.

9. The method of claim 1, further comprising, responsive to updating either the first component or the second component, controlling one or more actuators of a vehicle based on one or more actions of the second component.

10. A training system for training an autonomous vehicle system, the training system comprising:

one or more computing devices to:

pretrain an artificial intelligence model having a first component and a second component with a dataset to form a pretrained model;

employ the pretrained model to one or more tasks such that one or more observations are received;

responsive to employing the pretrained model, identify whether the first component or the second component is a predominant source of error based on the one or more observations; and selectively finetune either the first component or the second component based on whether the first component or the second component is the predominant source of error.

11. The system of claim 10, wherein selectively finetuning includes retraining the first component of the pretrained model on the one or more observations if the first component is the predominant source of error and adjusting the second component of the pretrained model if the second component is the predominant source of error.

12. The system of claim 10, wherein the first component is a predictive component, and the second component is a planning component.

13. The system of claim 12, wherein predominance is determined by comparing a total variation distance of the predictive component with the total variation distance of the planning component.

14. The system of claim 13, wherein the total variation distance of the predictive component represents a gap between predicted states of the first component and actual states, and the total variation distance of the planning component represents a gap between an optimal planning policy and a current planning policy.

15. The system of claim 14, wherein a threshold value is applied to the total variation distance of the planning component before comparing with the total variation of the predictive component.

16. The system of claim 15, wherein the threshold value is greater than 1.

17. The system of claim 15, wherein the threshold value is at least 10.

18. The system of claim 12, wherein the predictive component is a world model configured to simulate real-world environments to predict outcomes.

19. The system of claim 12, wherein the one or more observations are sensory inputs from a vehicle control system.

* * * * *